United States Patent
Rotstein et al.

(10) Patent No.: US 6,909,707 B2
(45) Date of Patent: Jun. 21, 2005

(54) METHOD AND APPARATUS FOR PSEUDO-RANDOM NOISE OFFSET REUSE IN A MULTI-SECTOR CDMA SYSTEM

(75) Inventors: Ron Rotstein, Arlington Heights, IL (US); Yuda Yehuda Luz, Buffalo Grove, IL (US); Robert T. Love, Barrington, IL (US); Dennis Ray Schaefer, Buffalo Grove, IL (US); Jiangnan (Jason) Chen, Darien, IL (US); Colin Frank, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 779 days.

(21) Appl. No.: 09/992,614

(22) Filed: Nov. 6, 2001

(65) Prior Publication Data

US 2003/0087640 A1 May 8, 2003

(51) Int. Cl.$^7$ ............................................. H04B 7/216
(52) U.S. Cl. ........................ 370/342; 370/329; 370/331; 370/334; 370/335; 370/441
(58) Field of Search ................................ 370/329, 331, 370/334, 335, 342, 441

(56) References Cited

U.S. PATENT DOCUMENTS

| | | | |
|---|---|---|---|
| 5,267,261 A | * 11/1993 | Blakeney et al. | ........... 370/332 |
| 5,649,292 A | 7/1997 | Doner | |
| 5,850,608 A | 12/1998 | Faruque | |
| 5,883,889 A | * 3/1999 | Faruque | ....................... 370/335 |
| 6,049,564 A | * 4/2000 | Chang | ......................... 375/130 |
| 6,272,122 B1 | * 8/2001 | Wee | ............................ 370/342 |
| 6,433,739 B1 | * 8/2002 | Soliman | ...................... 342/387 |
| 6,778,833 B1 | * 8/2004 | Fortuna | ........................ 455/446 |

\* cited by examiner

*Primary Examiner*—Kenneth Vanderpuye
*Assistant Examiner*—Jay Patel

(57) ABSTRACT

A method and apparatus for reuse of pseudo-random noise (PN) offsets within a cell of a wireless communication system such as a multi-sector CDMA system. Adaptive antenna arrays are employed to form the multiple sector areas within the CDMA cell. A forward link data channel is established between a mobile unit and a base station via sectors that share or reuse comment PN offsets, thereby providing desirable transmit diversity.

15 Claims, 2 Drawing Sheets

Figure 3:
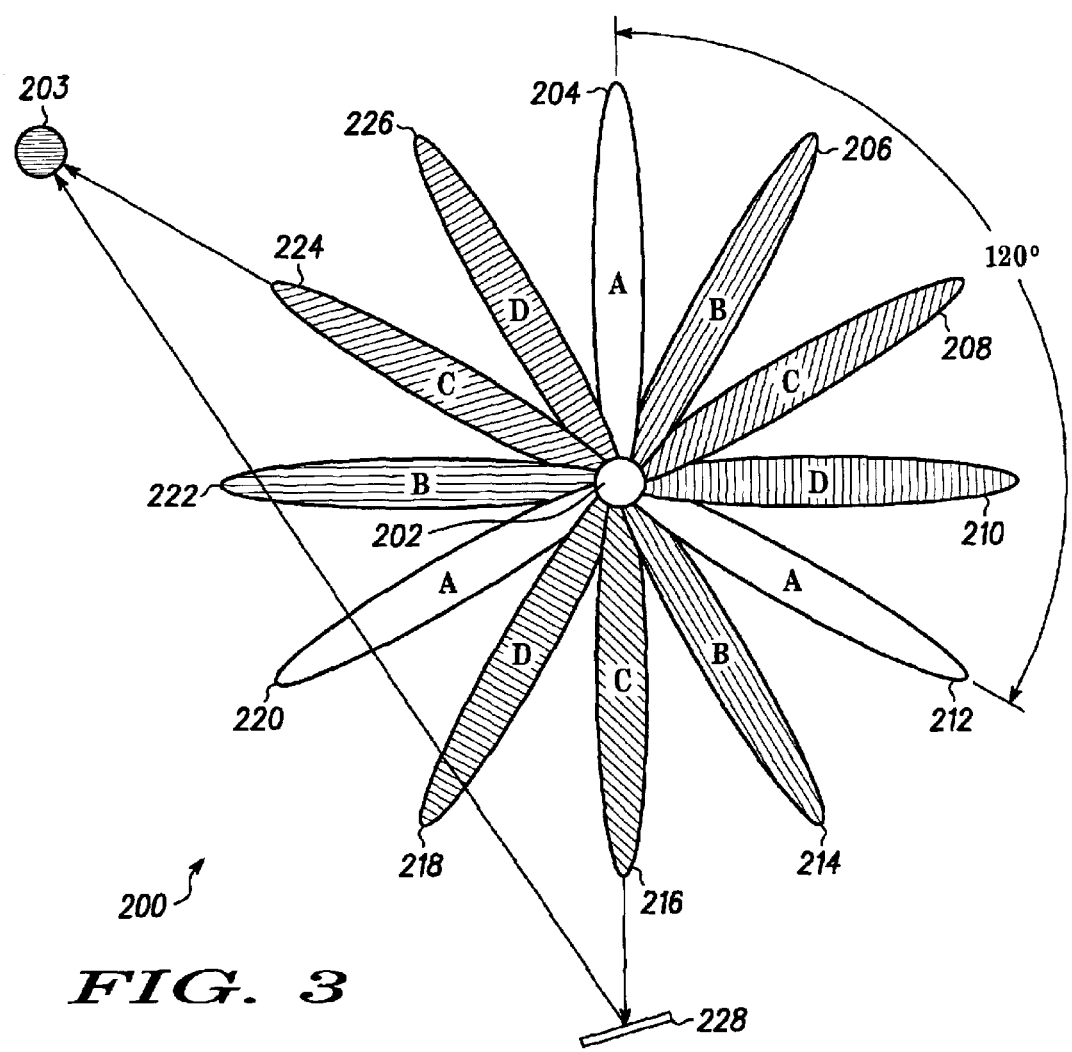

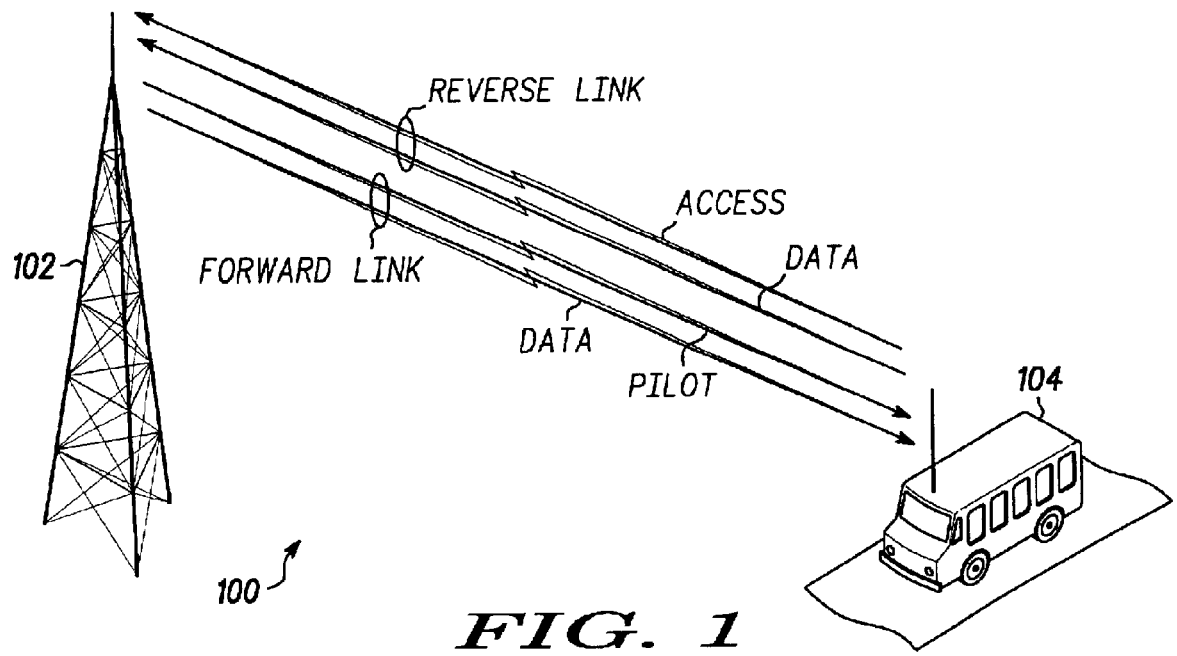
FIG. 1
| NUMBER OF SECTORS | SECTOR EARLANGS | SITE ERLANGS | CAPACITY GAIN FACTOR |
|---|---|---|---|
| 1 | 21.23 | 21.23 | 1 |
| 3 | 16.54 | 49.61 | 2.34 |
| 6 | 13.44 | 80.62 | 3.8 |
| 9 | 13.29 | 119.60 | 5.63 |
| 12 | 11.21 | 134.51 | 6.34 |
FIG. 2
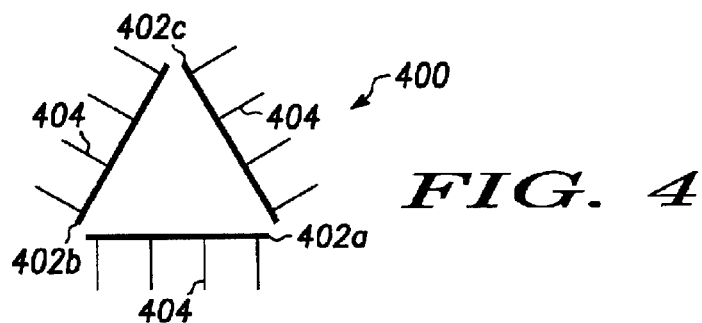
FIG. 4

METHOD AND APPARATUS FOR PSEUDO-RANDOM NOISE OFFSET REUSE IN A MULTI-SECTOR CDMA SYSTEM

FIELD OF THE INVENTION

The present invention relates generally to communication systems, and, more particularly, to a method and apparatus that achieves reuse of pseudo-random noise indices or offsets in a multi-sector communications systems such as a CDMA system.

BACKGROUND OF THE INVENTION

Typically in wireless communication systems such as that illustrated in FIG. 1, a base station 102 that transmits to and receives from mobile units 104 is used to create what is termed a cell. In CDMA wireless systems, in particular, optimization is a critical consideration that has significant impact on the performance and capacity of a CDMA system. Particularly in both 2G and 3G CDMA systems, the need to enhance the capacity of the systems is increasing. One method for optimizing capacity in a CDMA cell is to minimize areas suffering from pilot pollution. Typically a base station 102 has a number of antennas, each of which is used to form a respective sector within a CDMA cell. Each CDMA sector sends its own pilot channel requiring its own corresponding pseudo-random noise (PN) offset. If a mobile unit 104 is in a location within the CDMA cell where numerous pilot channels are received with relatively equal signal strength, pilot pollution likely will result. This pollution is detrimental because it may cause dropped calls and decreased capacity. Thus, the more sectors per cell may result in increased pilot pollution.

As the number of sectors per site or cell increases, however, so does the capacity of the system as those illustrated by the table in FIG. 2. As is shown, the increase in capacity from 1 to 12 sectors, for example, is over six times gain and the Erlangs for the site or cell increases from approximately 21 to 134. As mentioned previously, however, the increase in the number of sectors may increase degradation of the CDMA performance due to pilot pollution. A further problem is that more sectors require more antennas, power amplifiers and cables thereby increasing the cost of the system. As an example, a 12 sector system would require 24 receive antennas (i.e., 12 sectors×2 for receive diversity) and 24 transmit antennas (12 sectors×2 for transmit diversity).

Hence, there is a need to increase the capacity of CDMA systems by increasing the number of sectors while decreasing pilot pollution and reducing the cost outlay for system hardware.

BRIEF DESCRIPTION OF THE DRAWINGS

Features and advantages of the disclosed system and method will be apparent to those of ordinary skill in the art in view of the detailed description of preferred embodiments that is made with reference to the drawings, a brief description of which is provided below.

FIG. 1 is a diagram illustrating components of a CDMA cell.

FIG. 2 is a table illustrating the increase capacity of a CDMA cell as the number of sectors is increased.

FIG. 3 illustrates a CDMA cell having multiple sectors constructed in accordance with the teachings of the present invention.

FIG. 4 illustrates an example of a base station antenna configuration constructed in accordance with the teachings of the present invention.

FIG. 5 illustrates a block diagram of the reverse link receiver portion of the system at a base station in accordance with the teachings of the present invention.

DETAILED DESCRIPTION OF THE PREFERRED EMBODIMENTS

In order to enhance the capacity of a CDMA system, a method and apparatus are disclosed that include reuse or sharing of pseudo-random noise (PN) offsets within a cell of a wireless communication system such as a multi-sector CDMA system. Reuse of PN offsets affords a system where less PN offsets are needed. The disclosed method and apparatus further employ adaptive antenna arrays or a number of fixed narrow beams to form the sector areas within the CDMA cell. Moreover, the disclosed method and apparatus detect the existence of multi-path links between a base station and a mobile unit that are sharing or reusing common PN offsets. A forward link data channel is then established between both sectors, which provides desirable transmit diversity.

FIG. 3 illustrates an exemplary sector pattern of a CDMA cell in accordance with the teachings of the invention. A base station 202 includes a number of transmit and receive antennas (not shown) that are used to establish multiple sectors that emanate in beam patterns from the base station 202. The particular pattern illustrated in FIG. 3 utilizes a 12 beam pattern corresponding to a 12 sector system. The antenna arrays are set to form 12 sector beams 204, 206, 208, 210, 212, 214, 216, 218, 220, 222, 224 and 226 with each sector covering approximately 30° of the 360° coverage area. In the particular system shown, four PN offsets are used with each offset being repeated three times within the system. As will be appreciated by those skilled in the art, other configurations may be envisioned such as the use of three PN offsets repeated four times or six PN offsets repeated two times. Irrespective of the particular configuration that is to be used, the same PN offset should not be used in adjacent sectors and at least one PN offset should be used more than once at a given site.

As illustrated in FIG. 3, four PN offsets labeled A–D are utilized in the predetermined distance or angle and occurs in a repeating sequence of the PN offset sectors (e.g., A, B, C, D). For example, in the present disclosed system utilizing four PN offsets, beam sectors 204 and 212 that share the PN offset A are separated by 120°. Thus, for the present disclosed system the spatial degree of separation for sectors sharing the same PN offset is 120°. As an alternate example, if the system utilized three PN offsets being repeated four times, the spatial separation between sectors sharing the same PN index would be 90°.

Each of the PN offsets A–D has associated with its own pool of Walsh codes, such that the entire system has four times the number of Walsh codes in its pool as that of a single sector. Thus, all of the identical PN offsets are kept orthogonal to each other, which prevents cross-sector cross-talk. Additionally, pilot pollution in a mobile unit 203 is limited by the use of relatively narrow beams, thereby limiting the area that is covered by multiple PN offsets.

An additional feature of the disclosed method and apparatus include reallocation of system resources when a multi-path exists. For example, there is a finite probability that the mobile 203 shown in FIG. 3 is covered by sector 224 using PN offset C will see a multi-path ray from sector 216 as the pilot channel therefrom is reflected off some object 228. Similarly, the mobile 203 may see a multi-path ray from sector 208 also utilizing the PN offset C or multiple multi-path rays from both sectors 208 and 216. In conventional CDMA systems, if these sectors were utilizing different PN offsets, the system would go into what is termed "softer" handoff where the mobile 203 as it is traveling will receive a data channel from two or more sectors as it travels and eventually will be completely handed off from one sector to the other sector.

In the presently disclosed method and apparatus, however, the same PN offset that is reused in the two or more sectors may present a problem because the mobile unit 203 will not be able to differentiate between sectors 224, 208 and 216, for example. Accordingly, the mobile 203 may try to combine the data channels. Because sectors 208 and 216 do not transmit the same Walsh codes that are assigned to sector 224, however, the data channels from sectors 208 and 216 cannot be combined with the data channel from sector 224. In order to overcome this problem, the method and apparatus constructed in accordance with the teachings of the present invention utilize reverse link spatial information. That is, once a mobile unit 203 is identified at the base station 202 on the reverse link, the base 202 will scan through the entire 360° that it covers and will characterize the multi-path manifold of the mobile unit 203.

As a means to perform the reverse link scan, the method and apparatus constructed according to the teachings of the present invention preferably utilize an adaptive antenna array. An example of the topology of such an array is illustrated in FIG. 4, which shows a top view of the adaptive antenna array 400. Within the array 400 are three individual antenna arrays 402A, 402B and 402C whose faces are disposed at angles of approximately 60° with respect to one another, thereby forming a triangular arrangement. Each array 402 is used to cover 120° of the CDMA cell. Additionally, each one of the arrays 402 includes four specific adaptive antennas 404 that are directed by an antenna beam steering control to cover a particular 30° sector. Thus, the full 360° of the CDMA cell are covered by the 12 individual adaptive antennas 404. It is noted that the configuration illustrated in FIG. 4 is merely exemplary and other antenna topologies may be utilized, such as four adaptive arrays having three adaptive antennas each or simply 12 individual antenna arranged in a circular configuration to effect the exemplary pattern of FIG. 3.

It is noted that the adaptive antenna array illustrated in FIG. 4 is utilized for both the reverse link or forward link of the CDMA site. Accordingly, only one physical adaptive antenna array is required for the forward link or transmission side of the base station and the reverse link or receive portion of the base station. Additionally, redundancy may be introduced to the system by adding additional antenna arrays for the forward and reverse links. However, the method and apparatus disclosed according to the teachings of the invention eliminate the need for redundant antennas, which are typically used in the conventional art for transmit and receive diversity, since the use of multi-path connections achieves transmit diversity without the need for additional redundant antennas.

As multi-path connections to the mobile unit 203 shown in FIG. 3 is characterized, the base station 202 may utilize this information to determine if a significant multi-path link exists from either sectors 208 or 216, continuing with the previously described example. The forward link transmitter of the base 202 is then configured to transmit the sector 224 data onto one or both of sectors 208 and 216 to this specific mobile unit 203. Hence, the effect of this multi-path transmission is a even "softer" handoff diversity in the mobile unit 203 than is known previously in the conventional art.

Figure 5:
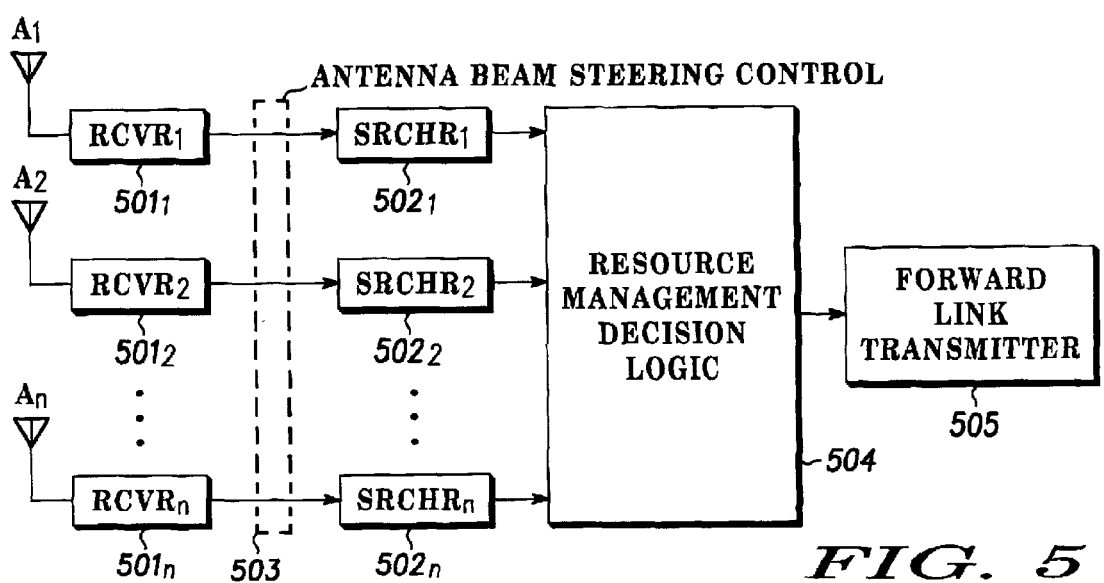

FIG. 5 illustrates a block diagram of the mechanism used in the reverse link portion of the base station 202 to achieve scanning and characterization of the multi-path manifold for a CDMA cell. In particular, a plurality of antennas $A_1$, $A_2 \ldots A_n$ for receiving transmitted signals on the reverse link are connected to respective receivers RCVR1–RCVRn ($501_1$–$501_n$). The variable "n" represents the number of sectors within the CDMA cell. In the example of FIG. 3, this "n" number of sectors is equal to 12. Once the information is received by the receivers 501, it is fed to searchers SRCHR1–SRCHRn ($502_1$–$502_n$) corresponding to each receiver 501. The searchers 502 are used to accomplish scanning to determine which corresponding sectors may be covering a particular mobile user. The information from the searcher blocks 502 is passed to a resource management decision logic 504, which is used to characterize the multi-path manifold and decide if data should be transmitted to the mobile user from multiple sectors to establish multi-path links. Once this determination is arrived at by the resource management decision logic 504, a control signal is passed to the forward link transmitter 505 for execution of the particular multi-path transmission. FIG. 5 also includes an optional antenna beam steering control 503 that is used to direct the receivers 501 and their respective antennas to cover their corresponding sector areas. However, it is noted that if single antennas are used instead of an adaptive antenna array, the antenna beam steering control 503 is not necessary.

As will be appreciated by those skilled in the art, the disclosed method and apparatus reduces the number of PN offsets utilized by reusing or sharing PN offsets among two or more sectors in a CDMA cell. Additionally, by utilizing an adaptive antenna array, determination of multi-path links serves to maximize the capacity of a base site, which is particularly useful for high data rate users. Moreover, the disclosed method and apparatus afford an increase in site capacity to approximately 135 erlangs while maintaining the antenna complexity of a six sector level. A six sector system requires 12 antenna elements, 6 for the main branch and 6 for the diversity branch. The exemplary disclosed method utilizes the same number of antennas to provide a significant capacity enhancement (i.e., 12 sectors).

The foregoing description has been presented for the purposes of illustration and description. It is not intended to be exhausted or to limit the teaching of the invention to the exemplary embodiments disclosed. Many modifications and variations are possible in light of the above teachings and it is intended that the scope of the invention be limited not by this detailed description, but rather by the claims appended hereto.

What is claimed is:

1. A method of operating a wireless communication system that reuses Pseudo-random Noise (PN) offsets within at least one cell of the wireless communication system, the method comprising the steps of:

providing a plurality of sectors that collectively provide wireless coverage of an area of the at least one that emanates from a base station, the plurality of sectors having at least one or more sector groupings of at least two or more non-adjacent sectors, each sector grouping having shared PN offsets;

determining a particular sector of the plurality of sectors that services at least one communication unit; and detecting which of at least the other sectors in the sector grouping that includes the particular sector area having one or more reverse link channel multipath links between the at least one communication unit and the base station.

2. The method according to claim 1, further comprising the step of:

transmitting data from the at least one base station on a forward link channel from the particular sector area and the other sectors in the sector grouping that includes the particular sector area that have been detected as having a multipath link between the at least one communication unit and the base station.

3. The method according to claim 1 wherein the sectors are located with respect to one another at a fixed spatial separation.

4. The method according to claim 1, wherein there are four sector groupings each containing three sectors.

5. The method according to claim 4, wherein the sectors within a grouping are located relative to one another at a fixed spatial separation.

6. The method according to claim 5, wherein the fixed spatial separation is 120 angular degrees.

7. The method according to claim 1, wherein the wireless communication system is a CDMA system.

8. The method according to claim 1 wherein the plurality of sectors is arranged with a repeating sequence of sectors, the sequence including at least one sector from each grouping of sectors.

9. The method according to claim 1 wherein each PN offset has an associated pool of Walsh codes.

10. The method according to claim 1, wherein the step of detecting includes scanning reverse link spatial information and characterizing a multipath manifold of the at least one communication unit.

11. The method according to claim 1, wherein the sectors are formed using one or more adaptive antenna arrays.

12. The method according to claim 11, wherein the one or more adaptive antenna arrays are each comprised of three antenna portions each having a planar face, wherein the planar face of an antenna portion is oriented 60 degrees from the planar faces of each of the other two antenna portions in the antenna array.

13. The method according to claim 12, wherein each antenna portion is comprised of four adaptive antennas, each of the adaptive antennas having a respective aimed beam direction corresponding to a respective sector.

14. The method according to claim 1, wherein the at least one communication unit is a mobile telephone.

15. An apparatus that reuses Pseudo-random Noise (PN) offsets within at least one cell of a wireless communication system comprising:

a base station configured to create a coverage area of the at least one cell through transmitting and receiving communication signals, the base station further comprised of:

an antenna array having a prescribed number of antennas, each antenna configured to create a corresponding sector, wherein PN offsets are shared between two or more non-adjacent sectors;

a plurality of receivers where each receiver is connected to a corresponding antenna of the prescribed number of antennas and is configured to receive information from at least one communication unit within the at least one cell;

a plurality of searching devices where each searching device is connected to a corresponding receiver of the plurality of receivers and is configured to determine if the communication unit has a link to the base station through the corresponding sector;

a forward link transmitter; and a decision logic that is connected between the plurality of searching devices and the forward link transmitter and is configured to determine which sectors having shared PN offsets are in a communication link with the at least one communication unit and to direct the forward link transmitter to transmit information to the communication unit via all sectors having shared PN offsets that also are in a communication link with the at least one communication unit.

* * * * *